United States Patent [19]

Havas et al.

[11] Patent Number: 5,034,586
[45] Date of Patent: Jul. 23, 1991

[54] INDUCTION HEATING ASSEMBLY INCLUDING AN INTERPOSED CLOSED CONDUCTIVE LOOP FOR SUPPRESSION OF INTERCOIL COUPLING

[75] Inventors: George Havas, Liberty Township, Mahoning County; Charles N. Howell, Poland, both of Ohio

[73] Assignee: Ajax Magnethermic Corporation, Warren, Ohio

[21] Appl. No.: 518,138

[22] Filed: May 3, 1990

[51] Int. Cl.⁵ .............................................. H05B 6/40
[52] U.S. Cl. ........................ 219/10.43; 219/10.61 R; 219/10.71; 219/10.77; 219/10.79
[58] Field of Search ..................... 219/10.61 R, 10.71, 219/10.75, 10.79, 10.77, 10.43, 10.41

[56] References Cited

U.S. PATENT DOCUMENTS

| | | | |
|---|---|---|---|
| 3,762,912 | 10/1973 | Jacquerie et al. | 219/10.71 X |
| 4,420,667 | 12/1983 | Lewis | 219/10.77 |
| 4,447,690 | 5/1984 | Grever | 219/10.79 |
| 4,678,883 | 7/1987 | Saitoh et al. | 219/10.61 R |
| 4,845,332 | 7/1989 | Jancosek et al. | 219/10.77 |

Primary Examiner—Philip H. Leung
Attorney, Agent, or Firm—Fay, Sharpe, Beall, Fagan, Minnich & McKee

[57] ABSTRACT

An induction strip heating assembly is provided having multiple induction coils disposed in coaxial tandem and including at least two coil power sources for generation of first and second inducing currents in the coils for the induction heating of a workpiece, such as steel strip, passing therethrough. It is a feature of the invention that the assembly includes a closed loop of electrically conductive material coaxially interposed relative to the induction coils and disposed for induction therein of a circulating current opposite to a one of the inducing currents whereby a magnetic field of the circulating current in opposition to an inducing magnetic field of the inducing current causes a reduction in net magnetic field strength on a side of the loop opposite of the inducing current. Such an assembly provides suppression of intercoil magnetic coupling so that the coils may be spaced adjacent one another with less space between them than would be required if no loops were used.

19 Claims, 2 Drawing Sheets

INDUCTION HEATING ASSEMBLY INCLUDING AN INTERPOSED CLOSED CONDUCTIVE LOOP FOR SUPPRESSION OF INTERCOIL COUPLING

BACKGROUND OF THE INVENTION

This application pertains to the art of induction heating devices and, more particularly, to an induction strip heater having multiple induction coils arranged in tandem through which the strip being heated passes.

The invention is especially applicable to an induction strip heating line provided with multiple induction coils where two or more high frequency converters are employed as power sources to the coils and where the power sources may not run in synchronism with each other. However, it will be appreciated to those skilled in the art that the invention could be readily adapted to other uses and environments as, for example, where inter-power source energy coupling between adjacent coils is intended to be suppressed.

Induction strip heating lines having multiple induction coils arranged in tandem through which the strip being heated passes are well known in the art. Frequently, two or more high frequency converters are required as power sources. The output frequency of those converters depends upon the resonant frequency of a tank circuit comprised typically of a capacitor bank connected in parallel with the induction coil and its strip load. The firing of rectifier devices (SCRs) in the inverter section of the converters is timed by a feedback voltage from the tank circuit so that the inverter firing is caused to reinforce the natural frequency of the tank circuit. With the necessary physical arrangement of induction coils the currents in one coil will induce voltage in adjacent coils. Since the inverters of each converter are fired in harmony with its own tank circuit voltage, adjacent converters may not run in synchronism with each other. When an induced voltage from another converter circuit appears in the second tank circuit it distorts the wave shape being fed back to the firing control and may cause the inverters to fire at the wrong time creating an unstable condition which prohibits operation of the line. Where power supplies are operating at substantially the same operating frequency, they have a tendency to lock in synchronous operation and prevent independent control of the power supplies. The problem of independently and precisely controlling the power to the coil is the problem that the subject invention seeks primarily to correct.

Various forms and types of devices and assemblies have heretofore been suggested to reduce the power source energy coupling between adjacent coils. A first scheme comprises detuning the tank circuits so that each converter runs at a different frequency. In the heating of thin strips this is not always a commercially viable solution since it is highly desirable to keep the frequency as high as possible to avoid loss of heating efficiency. Another proposal comprises placing adjacent coils much farther apart. This is also not usually practical because a substantial space must be placed between the coils to avoid the coupling problem and this method would thereby disadvantageously increase the amount of space required for the induction heating installation.

The present invention contemplates a new and improved assembly which overcomes the above referred to problems and others to provide a new induction heating assembly which is simple in design, economical to manufacture, readily adaptable to a variety of dimensional characteristics, is rugged and reliable in operation, and which provides improved flexibility and operation in an induction strip heating line.

BRIEF SUMMARY OF THE INVENTION

In accordance with the present invention, there is provided an induction strip heating assembly having multiple induction coils disposed in coaxial tandem. At least two coil power sources, preferably comprising high frequency converters generate first and second inducing currents in the coils. A closed loop of electrically conductive material is coaxially interposed relative to the induction coils. The loop is disposed for induction therein of a circulating current opposite to the inducing currents. A magnetic field of the circulating current opposes the magnetic field of the inducing current to cause a reduction in the magnetic field strength on a side of the loop opposite of the inducing current for suppression of the intercoil coupling. We refer to a closed loop as a "decoupling ring" and it is preferably placed between adjacent coils. The use of the decoupling ring permits independent operation of adjacent converters powering adjacent coils with less space between the coils than would be required if no decoupling ring were used.

Decoupling rings may be made of any high conductivity metal, such as copper or aluminum. Selection of various inside dimensions, outside dimensions, thicknesses, and shapes will affect effectiveness of the ring.

In accordance with another aspect of the invention, multiple decoupling rings in tandem will further increase the effectiveness of the suppression of intercoil magnetic coupling.

In accordance with yet another aspect of the invention, the ring is equipped with a switch in one of its legs to allow the leg to be opened so that the ring may be withdrawn from a workpiece, like a continuous strip, without disturbing or cutting the strip.

One benefit obtained by use of the present invention is an induction heating line with suppressed intercoil magnetic coupling with reduced overall space requirements.

Another benefit obtained from the present invention is an induction heater with variable use of a plurality of decoupling rings which may be selectively inserted or withdrawn without disturbance of a workpiece passing through the heating line.

Other benefits and advantages of the subject new induction heater assembly will become apparent to those skilled in the art upon a reading and understanding of this specification.

BRIEF DESCRIPTION OF THE DRAWINGS

The invention may take physical form in certain parts and arrangements of parts. The preferred embodiments of which will be described in detail in this specification, and illustrated in the accompanying drawings which form a part hereof and wherein.

DETAILED DESCRIPTION OF THE INVENTION

Figure 1:
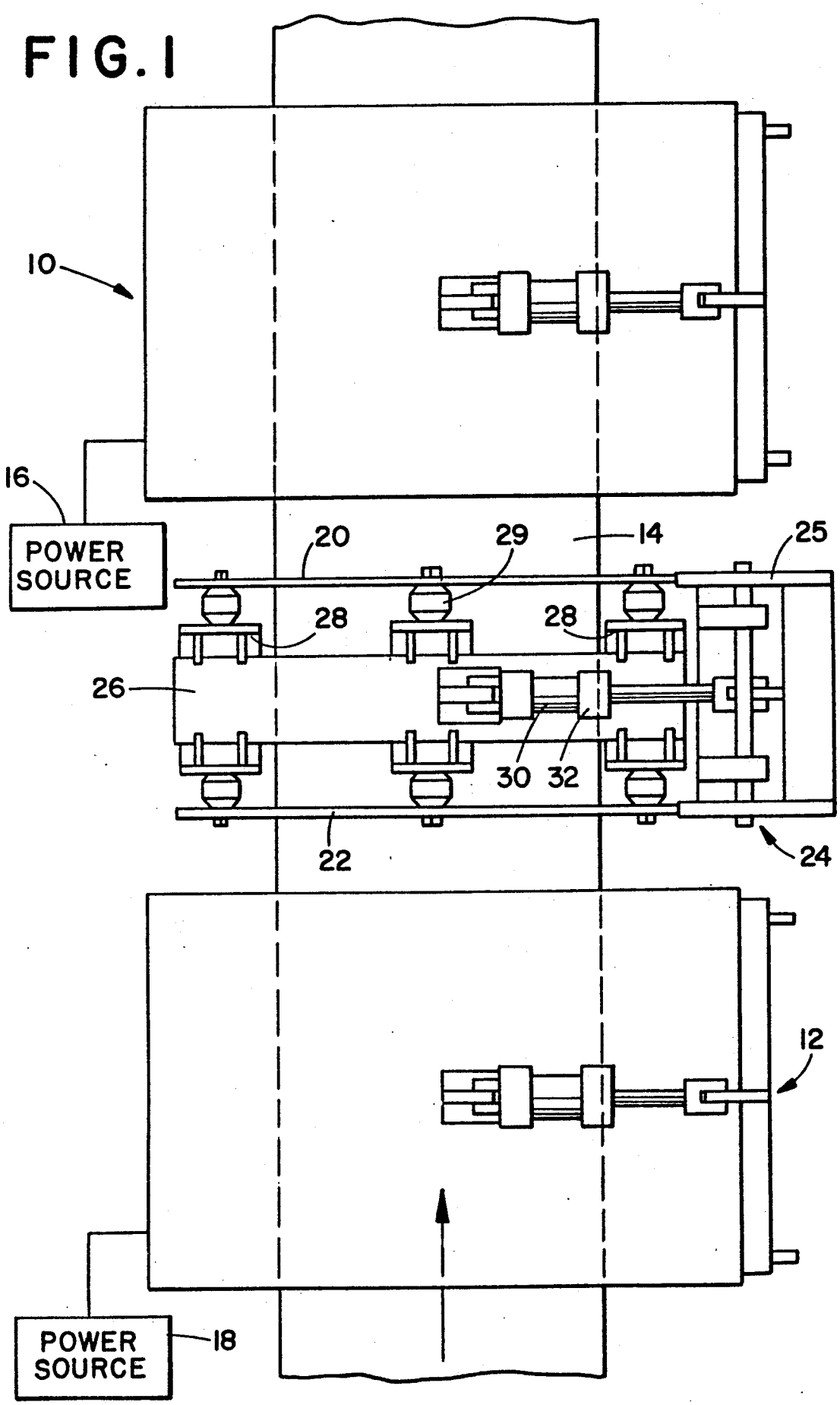
FIG. 1 is a schematic diagram (elevation view) of a heating line system made in accordance with the present invention and particularly illustrating a plurality of decoupling rings interposed between tandemly arranged heating coils; and, FIG. 2 is a side plan view of a decoupling ring made in accordance with the present invention.

Referring now to the drawings wherein the showings are for purposes of illustrating the preferred embodiments of the invention only, and not for purposes of limitation, the FIGURES show an induction strip heating assembly wherein first and second induction heating coils 10, 12 are arranged coaxially in tandem for heating a strip of steel 14 that is passing therethrough. First and second power sources 16, 18, preferably comprising high frequency converters, provide the appropriate energy to the coils 10, 12. The output frequency of the converters 16, 18 depends upon the resonant frequency of the associated tank circuit (not shown) comprised of a capacitor bank connected to the induction coils 10, 12. The firing of SCR devices in the frequency converters 16, 18 is timed by a feedback voltage from the tank circuits so that the power delivered reinforces the natural frequency of the tank circuits. The coils 10, 12 are normally spaced relative to each other so that the currents in one coil will induce voltage in the adjacent coil. The coils are thus coupled and the degree of coupling determines how effectively the coils can be independently operated.

In order to overcome intercoil magnetic coupling, one or more decoupling rings 20, 22 are interposed between the coils 10, 12. The decoupling ring is not necessarily a "ring", but is a closed loop of electrically conductive material, usually copper or aluminum, disposed between the induction coils 10, 12 and coaxial with the axes of the coils. Selection of the various inside dimensions, outside dimensions, thicknesses, and shapes will affect the effectiveness of the suppression of the intercoil magnetic coupling by the ring 20. The use of multiple decoupling rings 20, 22 in tandem will further reduce the interaction of the coils. Adjacent inducing coil currents in the coils 10, 12 will induce voltages into the decoupling rings 20, 22 which give rise to circulating currents therein that are essentially opposite in direction to the inducing current. The induced circulating current will thus set up a magnetic field in opposition to the inducing magnetic field of the inducing current to cause a reduction in the net magnetic field strength on a side of the ring opposite of the inducing current and thereby suppress intercoil magnetic coupling.

More particularly, the inducing current in the coil 10 will cause a circulating current in the rings 20, 22 which will reduce the magnetic field strength from the coil 10 on the second coil 12. Reduction in the magnetic field strength also results in a reduction of any voltage being induced into the coil 12 that will permit advantageous operation of adjacent converters 16, 18 powering adjacent coils 10, 12 with less space between the coils then required if no rings 20, 22 were used.

Figure 2:
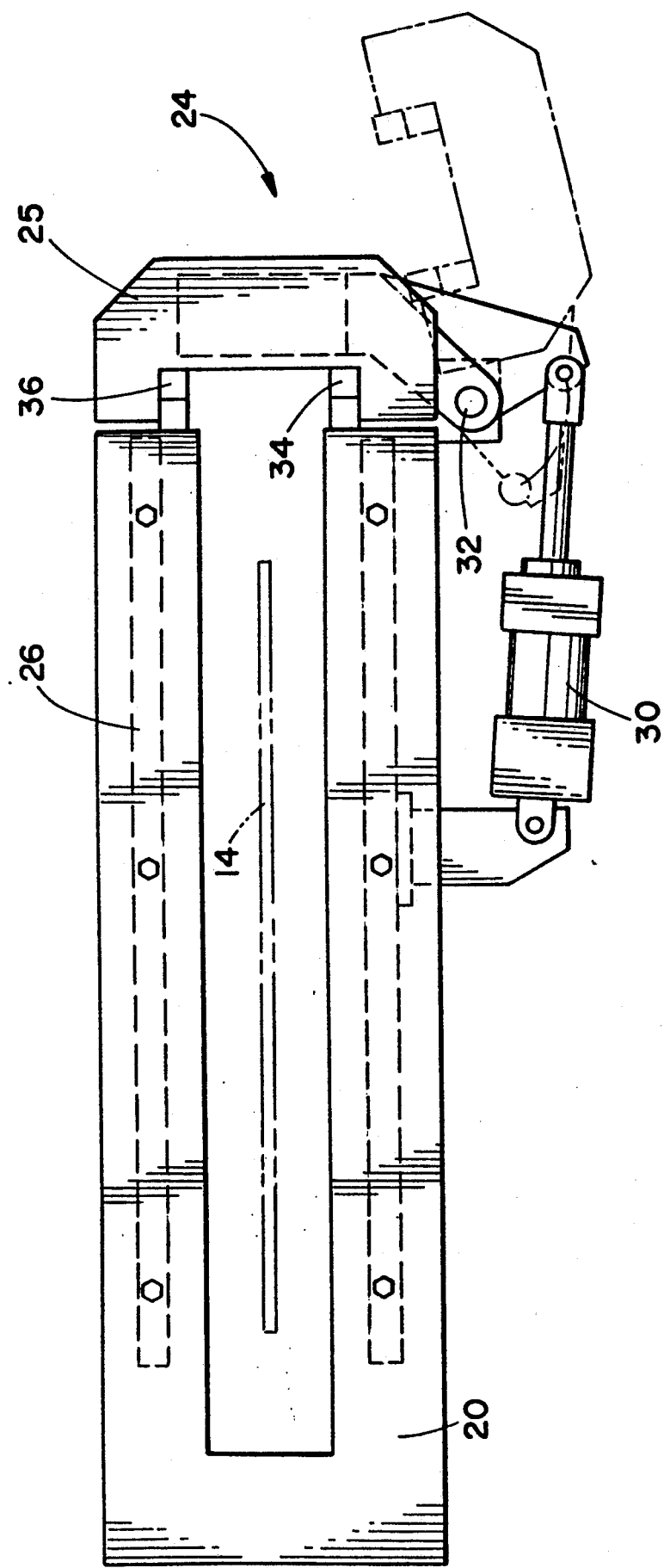

With particular reference to FIG. 2, the decoupling ring 20 is shown as including a switch 24 in one of the shorter legs 25 of the ring to allow the ring to be opened so that the ring may be withdrawn from a continuous strip 14 without disturbing or cutting the strip. The switch is selectively opened (as shown in dashed line) and closed by a piston 30 and hinge 32 assembly wherein electrical conductivity through the ring is accomplished through knife-edge contacts 34, 36 when the ring leg 25 is closed. The rings 20, 22 are positioned for coaxial alignment by a conventional frame device 26 (shown in dashed line) including support members 28 and associated insulators 29 (FIG. 1). In very high power applications, a cooling tube (not shown) may be associated with the ring.

The invention has been described with reference to preferred embodiments. Obviously, modifications and alterations will occur to others upon a reading and understanding of this specification. It is our intention to include all such modifications and alterations in so far as they come within the scope of the appended claims or the equivalents thereof.

Having thus described our invention, we now claim:

1. An induction heating apparatus comprising:
    first and second induction coils for heating an associated workpiece passing therethrough, the first coil located near the second coil;
    first and second power sources, the first power source operatively associated with the first coil and second power source operatively associated with the second coil, the first and second power sources being independent of each other with regard to frequency and synchronization; and,
    a first decoupling ring interposed between the first and second coil, the first decoupling ring effective to suppress magnetic coupling between the first and second induction coils.

2. The apparatus of claim 1 wherein the first decoupling ring comprises a closed loop of conducting material.

3. The apparatus of claim 2 wherein the coils are disposed to have common axes and wherein the first decoupling has an axis coaxial with the axes of the first and second induction coil.

4. The apparatus of claim 1 wherein a second decoupling ring is interposed between the coils.

5. The apparatus of claim 1 wherein the first decoupling ring includes a selectively operable switch for withdrawal of the ring without disturbance of a workpiece therein.

6. An induction heating apparatus as in claim 1 wherein the first power source is asynchronous with the second power source and operates at approximately the same frequency as the second power source.

7. The apparatus of claim 1 wherein the first decoupling ring includes a selectably removable segment, so that the ring may be removed from around the workpiece.

8. The apparatus of claim 7 wherein the decoupling ring may be selectably interposed between the first and second coils via means controllable from a remote location.

9. The apparatus of claim 1 wherein the decoupling ring is selectably interposed between the first and second coils.

10. An induction strip heating assembly having multiple induction coils disposed in coaxial tandem and including at least two coil power sources for generation of first and second inducing currents in the coils, the assembly further including:
    a closed loop of electrically conductive material coaxially interposed relative to the induction coils and disposed for induction therein of a circulating current opposite to a one of the inducing currents whereby a magnetic field of the circulating current in opposition to an inducing magnetic field of the inducing current causes a reduction in net magnetic field strength on a side of the loop opposite of the inducing current for suppression of intercoil magnetic coupling.

11. The assembly of claim 10 wherein a plurality of loops, arranged in tandem, are interposed between the coils.

12. The assembly of claim 10 wherein the loop includes a selectively openable leg switch for withdrawing the loop from the assembly.

13. An apparatus in combination with a plurality of induction heating coils, each induction heating coil being energized by a separate power supply which is not synchronized with the other power supplies, the apparatus comprising:
   means to decouple a first of said induction heating coils from a second of said induction heating coils, the decoupling means configured to produce circulating currents which are opposite in direction to inducing currents in the first and second coils, the circulating current creating a first magnetic field in opposition to a second magnetic field created by the inducing currents, thereby suppressing intercoil magnetic coupling.

14. The apparatus of claim 13 wherein the power supplies operate at approximately the same frequency.

15. The apparatus of claim 13 wherein the means is a loop of conductive material.

16. The apparatus of claim 15 wherein the loop is selectably interposed between a pair of induction heating coils, the loop being openable to allow its removal from around an associated workpiece without disturbing the workpiece.

17. A method of controlling independent power supplies in induction heating applications, the method comprising the steps of:
   energizing a first induction heating coil with a first power supply, the first power supply operating at a first frequency;
   energizing a second induction heating coil with a second power supply, the second power supply operating at a second frequency, the second induction heating coil being disposed a distance from the first induction heating coil, the distance being such that the first induction coil and power supply affects the second induction coil and power supply; and,
   decoupling the effects of the first induction coil and power supply from the second induction coil and power supply by inserting a closed loop of conductive material between the first and second induction heating coils.

18. The method of claim 17 wherein the first power supply is not in synchronism with the second power supply.

19. The method of claim 17 wherein the first and second frequency are approximately equal.

* * * * *